Figure 4:
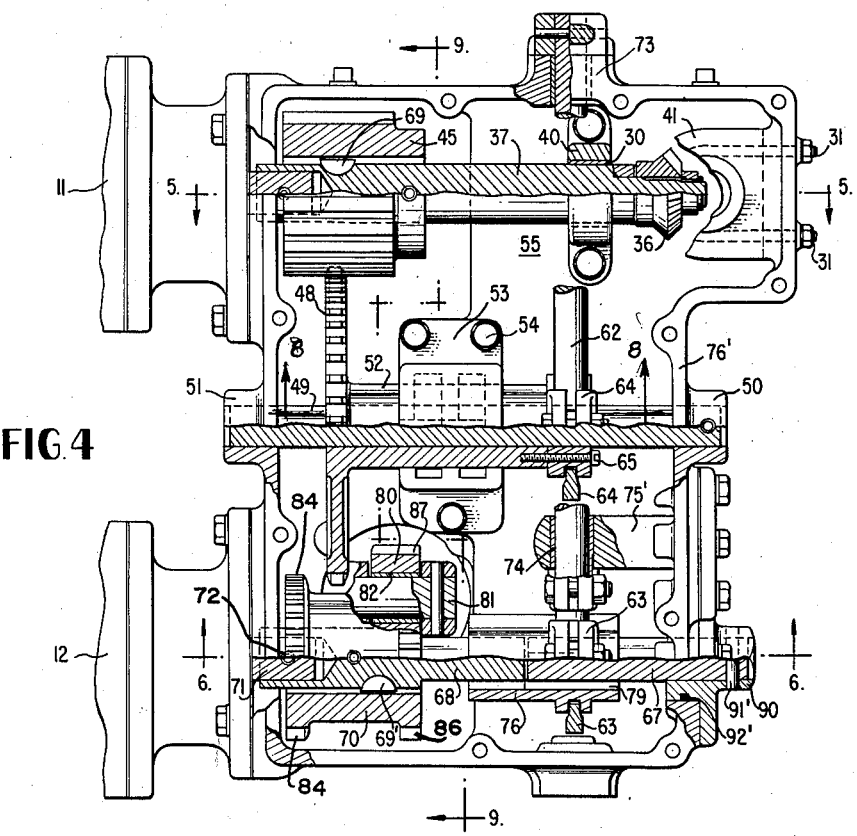

July 7, 1964
R. H. SHEPPARD
3,140,101
TRANSMISSION FOR CHOOSING THE MODE OF STEERING
ON A VEHICLE WITH TWO STEERABLE AXLES
Filed March 14, 1963
3 Sheets-Sheet 1
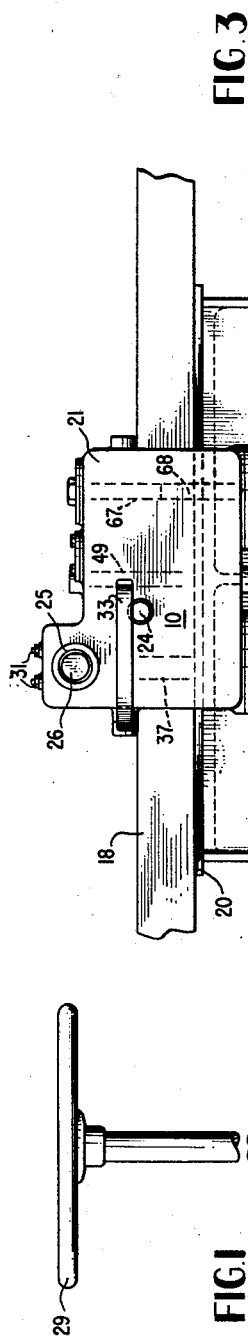
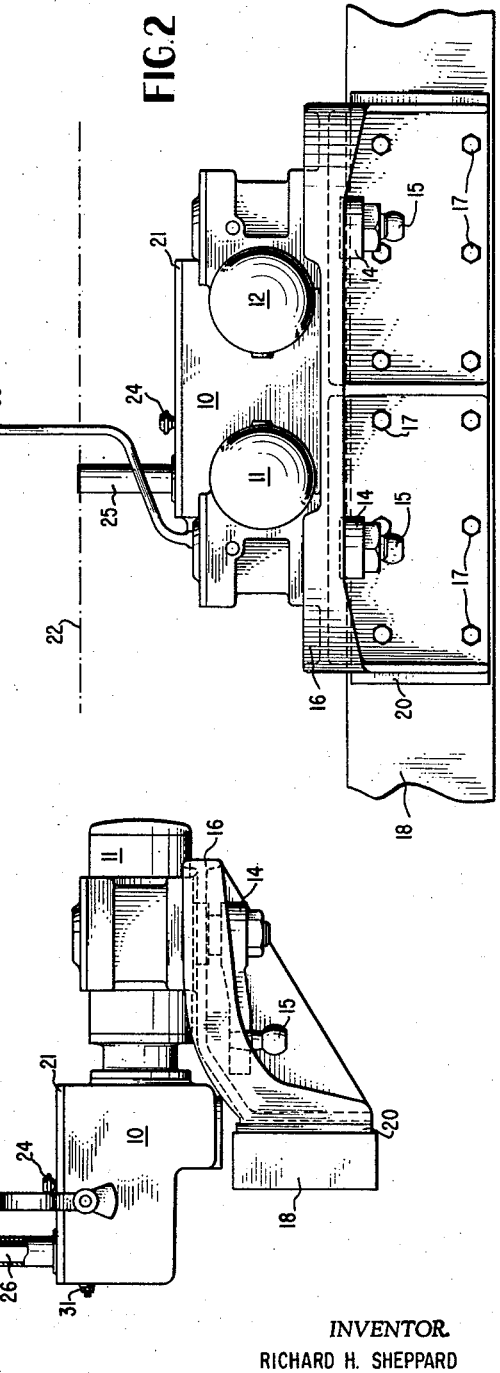
INVENTOR.
RICHARD H. SHEPPARD
BY Henry H Snelling
ATTORNEY July 7, 1964  R. H. SHEPPARD  3,140,101
TRANSMISSION FOR CHOOSING THE MODE OF STEERING
ON A VEHICLE WITH TWO STEERABLE AXLES
Filed March 14, 1963  3 Sheets-Sheet 2

INVENTOR.
RICHARD H. SHEPPARD
BY Henry H. Snelling
ATTORNEY

July 7, 1964 R. H. SHEPPARD 3,140,101
TRANSMISSION FOR CHOOSING THE MODE OF STEERING
ON A VEHICLE WITH TWO STEERABLE AXLES
Filed March 14, 1963 3 Sheets-Sheet 3

INVENTOR.
RICHARD H. SHEPPARD
BY Henry H Snelling
ATTORNEY

United States Patent Office 3,140,101
Patented July 7, 1964

3,140,101
TRANSMISSION FOR CHOOSING THE MODE OF STEERING ON A VEHICLE WITH TWO STEERABLE AXLES
Richard H. Sheppard, 101 Philadelphia St., Hanover, Pa.
Filed Mar. 14, 1963, Ser. No. 265,270
8 Claims. (Cl. 280—91)

This invention relates to transmission systems for connecting the manual steering wheel of a vehicle to two separate steering gears, each of which controls a steerable axle of the vehicle. While primarily the invention is designed for use on rubber tired vehicles such as bulldozers, tractors or mobile cranes where the two steering gears govern the position of the front wheels and the rear wheels respectively, either or both being power driven, the invention also covers vehicles where the two steering gears control a duplicate front axle or a duplicate rear axle.

The principal object of the invention is to provide a transmission of the type specified having simplicity, sturdiness, and which is easy to be applied to a vehicle.

A more specific object of the invention is to provide a transmission system for a four-wheeled vehicle so that the driver may choose wheel relations most favorable to use under different conditions, for example, to select at will a drive (a) most favorable to highway travel, or (b) one facilitating extremely short turning, or (c) to permit the movement of the vehicle in a sharply sideways direction as, for example, with all of the front and rear ground wheels directed at the same angle, right or left.

A further object of the invention is to provide a system of selective driving of two separate steering gears for two steerable axles in which neither of the steering gears can under any circumstances get out of phase with the other steering gear, one means for accomplishing this end being to prohibit shifting of the selector lever except when all ground wheels are in straight ahead position.

With the fairly simple mechanism of the present invention, the driver may move a conveniently placed selector lever to any one of three positions: the first position, preferably central, being best for high speed driving over highways and including locking one steering gear in straight ahead position and connecting the other steering gear to the manual steering wheel in conventional manner; the second position, one which is highly convenient for very short turning allowing the front wheels of the vehicle to be steered in conventional manner but through the front wheel steering gear of the present invention while the rear wheels turn at the same angle but in opposite direction, this being accomplished by coupling the rear wheel steering gear to the front wheel steering gear; and the third position of the selector lever allowing the vehicle to be turned to provide a largely sidewise movement, this arrangement being secured by reversing the rotation of the main shaft of the rear wheel steering gear whereby when the front wheels are turned left the rear wheels will automatically turn left to the same degree.

Figure 7:
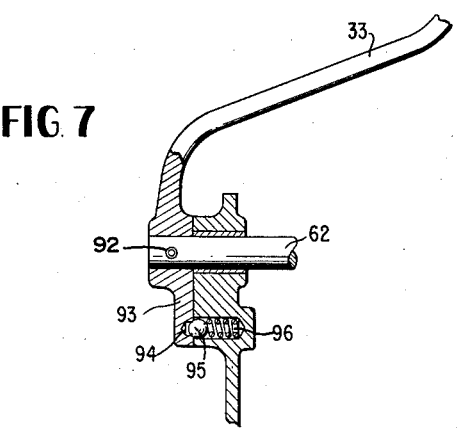
Figure 8:
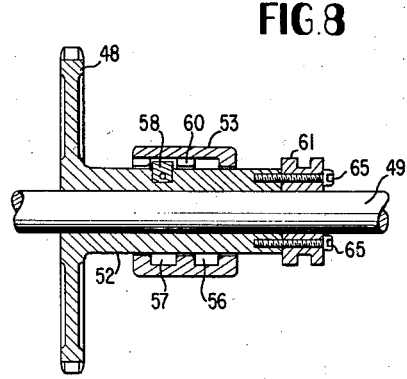
Figure 9:
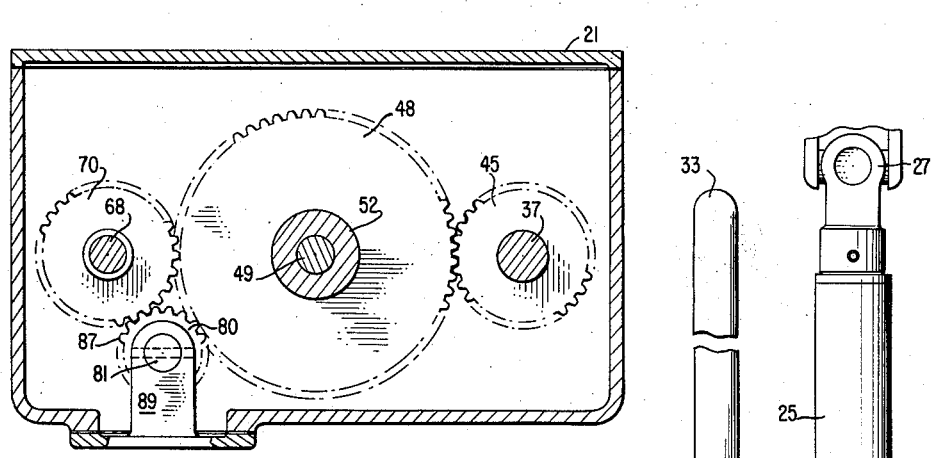
Figure 6:
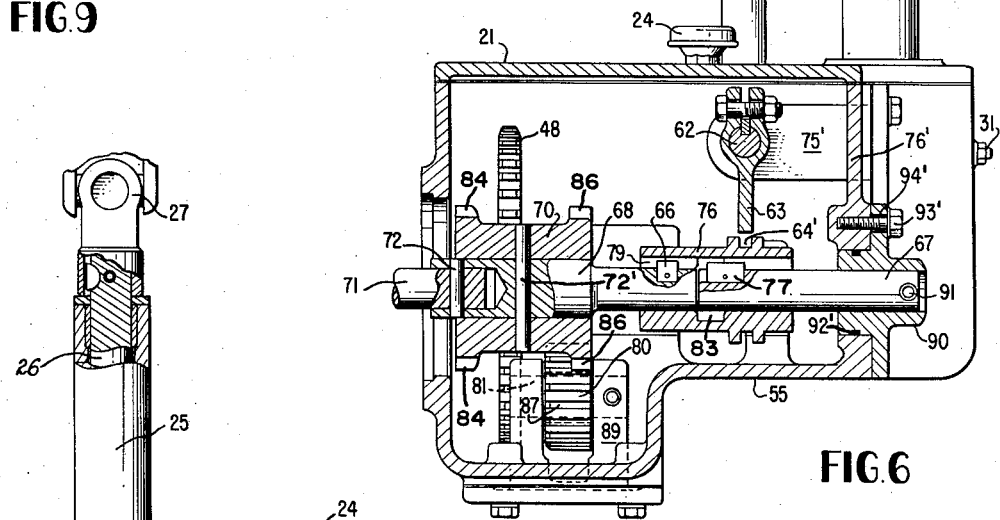
Figure 5:
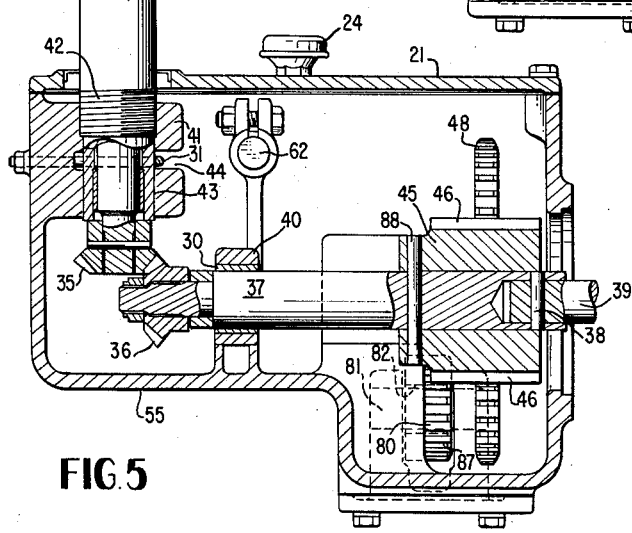

In the drawings:

FIGURE 1 is a front elevation;
FIGURE 2 is a side elevation;
FIGURE 3 is a plan view;
FIGURE 4 is a plan view on a larger scale of the interior of the transmission housing showing some of the parts in horizontal section;
FIGURE 5 is a vertical section on line 5—5 of FIGURE 4;
FIGURE 6 is a vertical section on line 6—6 of FIGURE 4;
FIGURE 7 is a vertical section on line 7—7 of FIGURE 4;
FIGURE 8 is a vertical section on line 8—8 of FIGURE 4; and
FIGURE 9 is a vertical section on line 9—9 of FIGURE 4.

As shown in FIGURES 1, 2 and 3, the mechanism of the present invention includes a housing 10 bolted to two spaced casings 11 and 12 each containing a steering gear of well known type by which to rotate a pitman arm such as 14 with a ball 15 for attachment to a drag link (not shown). The angle of movement of the pitman arm may conveniently be 45° from each side of the neutral position illustrated. These various members are supported on a sturdy bracket 16 secured by bolts 17 to the frame 18 of the vehicle, preferably with a steel plate 20 securely welded to the frame of the vehicle through both of which the bolts 17 are secured, so that the axes of the steering gears are at right angles to the centerline of the tractor.

The housing 10, preferably located less than a foot from the centerline of the tractor or other vehicle, has a cover 21 located a few inches beneath the floor board indicated by the dot and dash line 22 and carries the usual breather 24 and oil filter hole as well as the tube 25 in closing the actuating shaft 26 which is coupled by a universal joint 27 to the steering shaft within the steering post 28 and having at its top the manual steering wheel 29.

Near and in front of the tube 25 which is secured in adjusted position by a U-bolt 31, is mounted a curved selector lever 33 governing the position of the steering mechanism members so that the ground wheels may be positioned as previously stated, i.e., (a) suitable for highway driving, (b) to facilitate very short turning as by causing the rear ground wheels to move oppositely to the position of the front wheels and (c) to turn in the same direction as the front wheels, greatly aiding in moving the vehicle in a sideways direction, these movements having no effect on the speed of the vehicle.

Referring now to FIGURE 5, the actuating shaft 26 carries at its bottom a miter gear 35 driving a miter gear 36 on shaft 37 connected as at 38 to central shaft 39 of steering gear 11 and supported in a bearing 30 in bracket 40 rising from the floor of housing 10. Accuracy of position of miter gear 35 is accomplished by having tube 25 adjustable axially in its supporting inwardly directed bracket 41 by means of a threaded engagement as at 42 and a plane bore as at 43 whereby tube 25 may be rotated to accurate position and then be locked in place by tightening U-bolt 31 located in kerf or slot 44 in bracket 41. Horizontal shaft 37 carries driving gear 45 which has wide spur teeth 46 and is secured to shaft 37 by pin 88 and a key 69. Gear 45 is constantly in mesh with the teeth of sliding gear 48 shown behind gear 45 in FIGURE 5, this gear 48 idling when in neutral as illustrated in all of the figures.

Turning now to FIGURE 4, shaft 37 is shown at the top of the figure and sliding gear 48 is shown as slidable on stationary shaft 49 located centrally in FIGURE 4 and supported in bosses 50 and 51 extending outwardly from opposite side walls of housing 10. Sleeve 52 of gear 48 slides from side to side within a stationary bracket 53 bolted as at 54 to housing bottom wall 55. Bracket 53, as probably better seen in FIGURE 8, has two annular grooves 56 and 57. A key 58 secured to sleeve 52 may travel freely in annular groove 57 when gear 48 is running idly as illustrated. Key 58 may move freely from side to side in slot 60 of FIGURE 8 but only when selector lever 33 is in neutral position.

Movement of gear 48 with its sleeve 52 and collar 61 is accomplished by moving selector lever 33 to the right or left. This movement rotates horizontal shaft 62 fast to selector lever 33. Shaft 62 carries two simultaneously acting spaced yokes 63 and 64, the latter engaging collar 61 bolted as at 65 to sleeve 52 of sliding gear 48.

As later explained, selector lever 33 and with it shaft 62 may be moved only when shift control key 58 and a similar key 66 (FIGURE 6) so permit. Yoke 63, as best seen in FIGURE 6, engages an annular groove 64' in a sleeve 76 later to be described. Arbor 67 near the bottom of FIGURE 4 and as better illustrated in the vertical section of FIGURE 6, is stationary and is closely spaced from coaxial rotatable shaft 68 which is connected to a spool shaped driven gear 70 by key 69' and also to the central shaft 71 of rear wheel steering gear 12 by rollpin 72. A locking key 66 pinned to rotatable shaft 68 is slidable in horizontal slot 79 when shaft 62 through yoke 63 moves sleeve 76.

Horizontal shifting shaft 62 shown in FIGURES 4 to 7 is rotated through a small angle about 90° from its normal central position by selector lever 33. The shaft has a bearing in boss 73 extending forwardly from the front wall of housing 10 and has a second bearing 74 in bracket 75' extending inwardly from wall 76' of the housing as best seen in FIGURES 4 and 6. Horizontal shifting shaft 62 carries respectively from top to bottom in FIGURE 4 the selector lever 33, yoke 64 directly over stationary central shaft 49 and yoke 63 directly over arbor 67 near the bottom of this figure and which is coaxial with rotating shaft 68 which drives the rear wheel steering gear 12. The two yokes always move in unison and only when keys 58 and 66 so permit, this arrangement insuring that neither gear 11 nor gear 12 can under any possible contingency get out of correct relationship with the other. Arbor 67, while otherwise stationary, is adjustable to provide exact timing as it is made fast by rollpin 91 to rotatable flange 90 carrying an O-ring 92' and locked in adjusted position by bolt 93' in a slot 94' of small length.

The selector lever 33 and its shaft 62 are free to move from any one position to either of the other two positions at such times as all four ground wheels are pointing straight ahead as at such time key 58 (FIGURE 8) may freely be moved from side to side in horizontal groove 60 in stationary bracket 53 and sleeve 76 (FIGURE 6) can be moved from side to side on arbor 67 without interference from keys 66 and 77 both at such time being aligned in horizontal groove 79 of shiftable sleeve 76. Expressing the same thought in different words, with the various elements in neutral position and the selector lever therefore being in its mid-position, large diameter sliding gear 48, while seemingly free to move either way while remaining in mesh with wide-toothed gear 45, cannot move unless the selector lever 33 is moved to one side or the other, either of which motions would operate the yokes 63 and 64 simultaneously moving both gear 48 and sleeve 76 which latter cannot rotate because of key 77. Gears 45 on shaft 37 and 70 on shaft 68 at the top and bottom respectively of FIGURE 4 have approximately half the number of teeth that sliding gear 48 has so that while each of the smaller gears make a trifle less than two complete revolutions in each direction the sliding gear 48 makes less than a full revolution while turning in either direction, thus making it possible to use only a single axial slot 79 in sleeve 76 or in bracket 53 thus requiring only a single permissible shifting position. This prevents any opportunity for the mechanism to get out of phase.

Reversing idler gear 80 turns about a shaft 81 having a bearing 82 in bracket 89 and has wide teeth 87 which mesh with gear 48 when the latter is moved to the right from neutral position. It should be noted that sliding gear 48 with its sleeve 52 and its collar 61 (FIGURE 8) and also rotatable shaft 68 (FIGURE 6) are free to rotate only when key 66 (FIG. 6) is in annular groove 83 and key 58 (FIG. 8) is in annular groove 57, or when these keys are completely out of the axial grooves 79 and 60 in sleeve 76 and bracket 53, respectively. Locking key 77 being fast to stationary shaft 67 is never free of the axial groove 79 in shiftable sleeve 76. Key 58 is in annular groove 57 when selector lever 31 and shaft 62 are in neutral position. This key 58 moves into annular groove 56 when sliding gear 48 moves to the right, that is, towards sleeve 50 and is free of its horizontal groove 60 when sliding gear 48 is moved fully to the left at which time teeth 84 of spool gear 70 are in mesh with slidable gear 48. When the gear 48 is moved to the right the teeth of this gear drive the wide teeth 87 of reversing idler gear 80. The teeth 87 are engaged with teeth 86 of spool gear 70 and consequently reverse the direction of rotation of spool gear 70, rotatable shaft 68 and main rear wheel steering gear shaft 71 which members always rotate as a unit because of roll pins 72 and 72' (FIGURE 6) and key 69' (FIGURE 4).

As shown in FIGURE 7 the selector lever 33 is secured to shaft 62 by means of roll pin 92. The lower end 93 of this lever has three spaced recesses 94 to receive a ball 95 spring-pressed as at 96 to hold the selector lever quite securely in any one of its three positions.

*Operation*

With the parts in neutral position as illustrated, i.e., with the front wheels driven in conventional manner, the train is as follows:

From the shaft of manual steering wheel 29 within post 28, via universal joint 27 to actuating shaft 26 in sleeve 25 by way of the two miter gears 35 and 36 to shaft 37 which carries wide-toothed spur gear 45 and directly drives the center shaft 39 of the front wheel steering gear 11 of well-known construction which moves the pitman arm 14 carrying ball 15 (FIGURE 1) connected to the customary drag link (not shown) for controlling the steering of the front wheels. While the larger diameter sliding gear 48 is constantly in mesh with the main drive gear 45, as best seen in FIGURES 4 or 5 it rotates idly in the neutral position illustrated.

When the vehicle wheels are in straight ahead position the shift lever 33 may be moved through an angle of about 17° to either side. If to the right, this causes the large diameter sliding gear 48 to move to the left and into engagement with gear teeth 84 of spool gear 70 fast to rotatable shaft 68 and secured to the center shaft 71 of the rear wheel steering gear 12 which operates pitman arm 19 in the same manner as pitman arm 14 is moved. Movement of selector lever 33 in the opposite direction moves the sliding gear 48 to the right and brings it into engagement with reversing idler 80 which consequently reverses the rotation of shaft 71 and therefore governs the position of the rear wheels.

What I claim is:

1. In a vehicle for moving either forward, diagonally sideways, or for turning in a short radius, a manual steering wheel, a front wheel steering gear assembly, a rear wheel steering gear assembly, each of the assemblies having a central shaft, mechanism for connecting the steering wheel to the central shaft of the front wheel steering gear assembly including a drive shaft connected to the central shaft of the front wheel steering gear assembly and carrying a wide tooth driving gear responsive at all times to rotation of the steering wheel, a rotating shaft operatively connected at its outer end to the central shaft of the rear wheel steering gear assembly and carrying a spool gear, an idler gear in constant mesh with one of the rings of teeth of the spool gear, an arbor coaxial with the rotating shaft proximate the inner end thereof, a stationary central shaft parallel to the arbor and having thereon a sliding gear in constant mesh with the wide toothed driving gear and movable to three positions, a central position in which the sliding gear runs idle, a side position in which the sliding gear drives the spool gear through the other ring of teeth thereof in one direction of rotation, and an opposite side position in which the sliding gear meshes with the idler gear to drive the spool gear and rear wheel steering gear assembly in opposite direction of rotation.

2. The vehicle of claim 1 in which there is a sleeve slidable on both said arbor and its coaxial shaft, the sliding gear has an integral hollow cylindrical extension sliding in a bracket in fixed position on the vehicle, and means carried in part by the sliding gear for preventing sliding movement of the sleeve except in a single relationship of the central shafts of the two steering gear assemblies.

3. The vehicle of claim 2 in which the last means includes the bracket, the latter having a longitudinal groove and two annular grooves intersecting the longitudinal groove and the hollow cylindrical extension of the sliding gear has an outwardly extending key slidable in said grooves as the sliding gear is shifted in position.

4. The vehicle of claim 3 in which the longitudinal groove of the bracket fits the key snugly, the sleeve slidable on the arbor and the coaxial shaft has a longitudinal groove, the arbor has an outwardly projecting key fitting said last mentioned groove snugly, the spool gear shaft carries a key fitting snugly the last mentioned longitudinal groove, and means for simultaneously shifting axially the slidable gear and the arbor sleeve, whereby the several keys must be in a single relationship before the slidable gear and the arbor sleeve can be shifted, thus insuring that the two steering gear assemblies may never get out of phase.

5. The vehicle of claim 4 with means for rotatingly adjusting the arbor so that the two keys are in exact registry and for locking the arbor in such adjusted position.

6. The vehicle of claim 2 in which the wide toothed driving gear on the drive shaft and the spool gear on the rotating shaft each has approximately half the number of teeth as the sliding gear so that each of said small gears just mentioned makes a trifle less than two complete revolutions while the sliding gear makes less than a full revolution while traveling in either direction whereby only one axial slot in the sleeve and only one axial slot in the bracket is needed for said means for preventing sliding movement of the sleeve.

7. In a vehicle for moving either forward, diagonally sideways, or for turning in a short radius, and having a manual steering wheel, a vehicle frame, a supporting bracket secured to the frame at one side, a transmission housing on the bracket and secured to a pair of parallel steering gear assemblies for steering separate steerable axles, four shafts having parallel axes within the housing, specifically a first shaft directly connected to one of the steering gear assemblies, a central stationary shaft, an arbor and a fourth shaft coaxial with the arbor and connected to the other steering gear assembly, means for operatively connecting the first shaft with the manual steering wheel, a driving gear on the first shaft, a large diameter gear constantly meshing with the drive gear and slidable on the central shaft, a spool gear on said fourth shaft having two spaced sets of teeth, one set meshing with the large diameter gear in one position of the latter, and a reversing idler gear meshing with said large diameter gear in another position of the latter to reverse the direction of rotation of the fourth shaft through the other set.

8. The combination of claim 7 with means including a selector lever within convenient reach of the driver of the vehicle for shifting the large diameter gear on the central stationary shaft from a central position to one side position in which the large diameter gear drives the fourth shaft in one direction or to the other side position in which the large diameter gear drives the fourth shaft in opposite direction, and restraining means associated with the large diameter gear and with the arbor and the coaxial fourth shaft for preventing shifting of the selector lever except when both of the steering gear assemblies are in position for straight ahead travel and the ground wheels are therefore in straight ahead position.

References Cited in the file of this patent
UNITED STATES PATENTS

| | | |
|---|---|---|
| 1,685,171 | McVicker | Sept. 25, 1928 |
| 2,311,201 | Backhus | Feb. 16, 1943 |
| 2,366,122 | Merce | Dec. 26, 1944 |
| 2,687,928 | Russey | Aug. 31, 1954 |
| 2,966,067 | Sommer | Dec. 27, 1960 |
| 3,031,024 | Ulinski | Apr. 24, 1962 |